No. 660,448. Patented Oct. 23, 1900.
C. H. METZ.
BICYCLE.
(Application filed Aug. 22, 1898.)
(No Model.)  2 Sheets—Sheet 1.
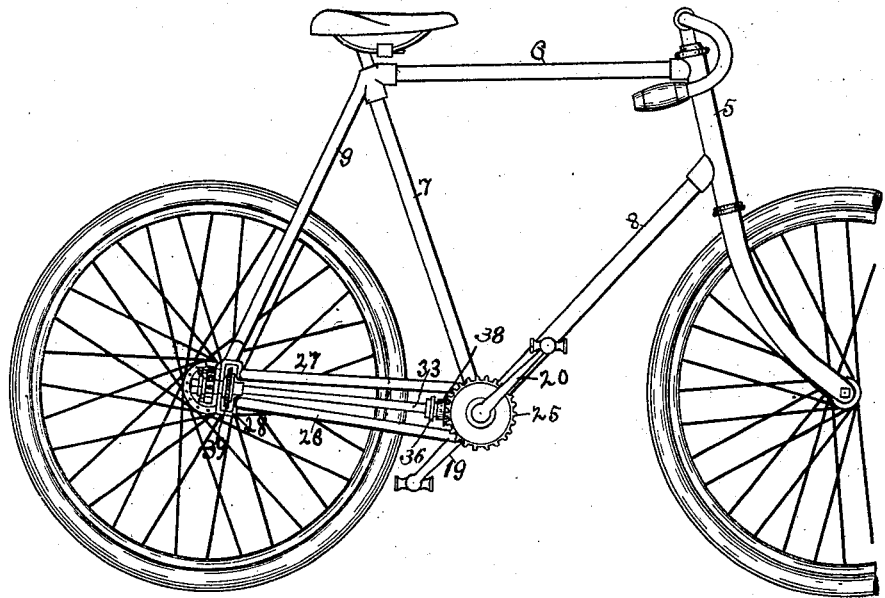
Fig. 1.
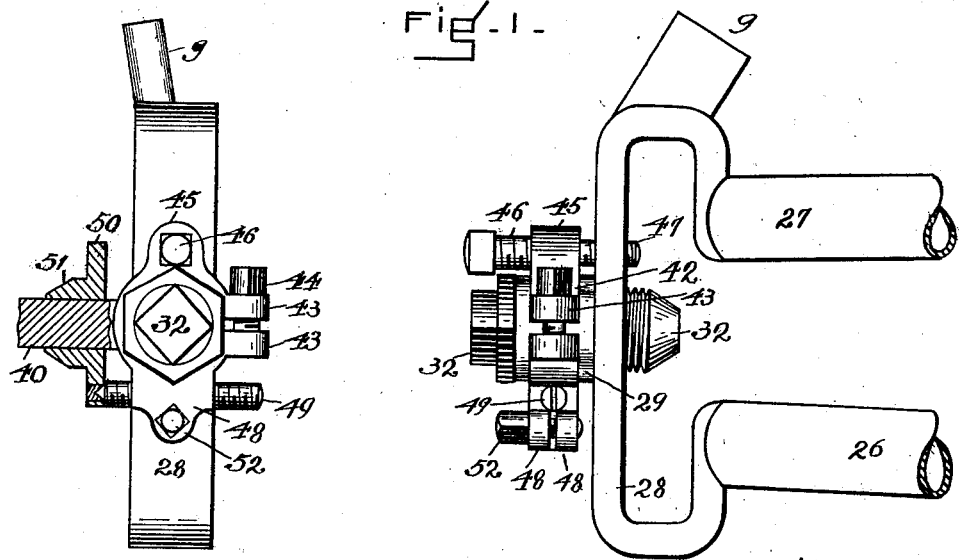
Fig. 2.  Fig. 3.
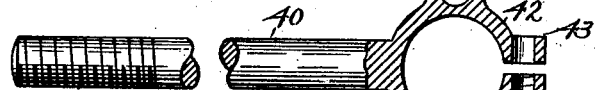
Fig. 4.
WITNESSES
INVENTOR
THE NORRIS PETERS CO., PHOTO-LITHO., WASHINGTON, D. C.

No. 660,448. Patented Oct. 23, 1900.
C. H. METZ.
BICYCLE.
(Application filed Aug. 22, 1898.)
(No Model.) 2 Sheets—Sheet 2.
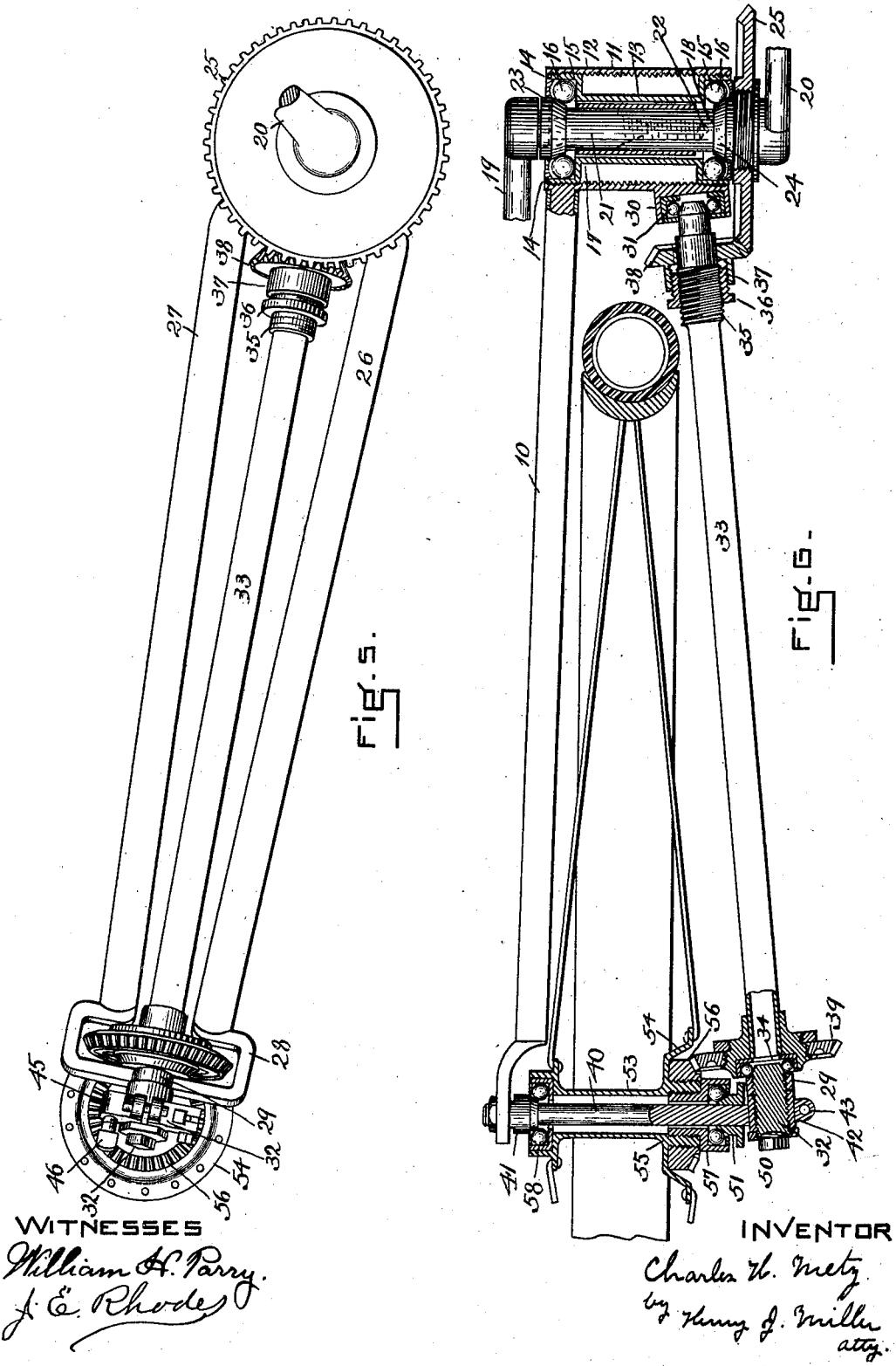
WITNESSES
William H. Parry.
J. E. Rhode.
INVENTOR
Charles H. Metz.
by Henry J. Miller
atty.

UNITED STATES PATENT OFFICE.

CHARLES H. METZ, OF WALTHAM, MASSACHUSETTS.

BICYCLE.

SPECIFICATION forming part of Letters Patent No. 660,448, dated October 23, 1900.

Application filed August 22, 1898. Serial No. 689,205. (No model.)

*To all whom it may concern:*

Be it known that I, CHARLES H. METZ, of Waltham, in the county of Middlesex and State of Massachusetts, have invented certain new and useful Improvements in Bicycles; and I hereby declare that the following is a full, clear, and exact description of the same, reference being had to the accompanying drawings, forming part of this specification.

This invention has reference to improvements in bicycles and vehicles of a similar nature.

The object of the invention is to improve the construction of a side-driven bicycle with relation to the side drive-shaft, the frame embracing said shaft, the rear bearing for the drive-shaft, and the shaft of the rear wheel, whereby the rear bearing for the side shaft becomes the support for one end of the rear-wheel shaft, which is peculiarly-attached thereto.

The invention consists in the peculiar feature of construction and combination of parts, which shall hereinafter be more fully described, and pointed out in the claim.

Figure 1 represents a side elevation of the improved bicycle. Fig. 2 represents an enlarged end view of the drive-shaft frame with the frame for the rear wheel secured to the adjustable bearing. Fig. 3 represents a side view of the same, Fig. 4 representing side and plan views of the shaft for the rear wheel with its securing and adjusting ring partly in section. Fig. 5 represents an enlarged side elevation of the drive-gear and its frame separate from the frame. Fig. 6 represents a plan view of the rear fork, the drive-gear being shown in section.

Similar numerals of reference designate corresponding parts throughout.

In the drawings, in Fig. 1, the improvements now under consideration are shown as combined with the frame of an otherwise ordinary bicycle, in which 5 is the steering-head; 6, the backbone; 7, the seat-post tube; 8, the inclined brace, and 9 the brace of the rear fork, of which the arm 10 and the drive-shaft frame form the lower members. (See Fig. 6.) At the junction of the tube 7 and the brace 8 is secured the crank-hanger sleeve 11, to which the arm 10 is connected. The inner surface of this sleeve is screw-threaded, as at 12, and in these threads are engaged the screw-threads of the bearing-sleeve 13, having the key-seats 14 14 for the engagement of a key to turn the sleeve 13 and adjust the same by the screw-thread engagement with the hanger-sleeve to move the bearing-sleeve and its contained mechanism longitudinally with reference to the hanger-sleeve. The bearing-sleeve 13 has raceways 15 15, carrying balls 16 16, on which are journaled the cones of a crank-shaft of any usual construction, that in the drawings having interlocking abutting sections 17 and 18, which are formed in part with the crank-arms 19 and 20. The section 17 is tubular to receive the bolt 21, which engages with the screw-threaded socket 22 in the section 18. On the shaft-sections are the cones 23 and 24, and on the enlarged portion of the section 18 is secured the beveled gear 25. From the hanger-sleeve 11 extends the arms 26 and 27, which first curve outward and then gradually approach each other until they connect with the vertically-enlarged yoke 28, having the screw-threaded hub 29, which corresponds in axial alinement with the cup 30 on the hanger-sleeve 11, containing the ball-bearing 31.

In the hub 29 is mounted the screw-threaded cone 32, having means whereby it may be engaged with a wrench or a key and suitably-locked nuts.

The drive-shaft 33 has a forward end adapted to rotate in the ball-bearing 31 of the cup 30 and a rear end furnished with the ball-bearing 34, adapted to rotate on the cone 32. At the forward portion of the shaft is the screw-threaded enlargement 35, on which is mounted the adjusting-sleeve 36, having an internal thread to engage the thread of the enlargement 35 and an external thread to engage the thread of the sleeve 37 on the gear 38, which gear has a sliding fit on a portion of the shaft and by the rotation of the sleeve 36 is adjusted with relation to its engagement of the gear 25. At the rear end the shaft 33 is provided with the gear 39, secured to the shaft in any suitable manner for the purpose in view. The peculiar shaft 40 for the hub of the rear wheel is screw-threaded at one end. On this screw-thread is adjustably mounted the cone 41, and this end of the shaft is secured in the slotted portion of the fork member 10, as is customary and well known. At its opposite end this shaft 40 has a clamping-frame 42, extending at an angle from the main portion of the shaft to permit of its fitting over the sleeve on the screw-cone 32. The frame is split and has perforated ears 43 43, through which the bolt 44 is engaged to clamp the frame in place. At its upper portion the frame has the perforated member 45, in which the screw-bolt 46 works, this bolt having an extension 47 of smaller diameter than the main portion of the bolt and having a thread of finer pitch, which engages in a threaded perforation of the yoke 28, so that on turning the bolt the frame 42 will be moved toward or from the yoke 28. At its lowest portion the frame 42 has the ears 48 48, between which is a screw-threaded perforation for the screw 49, which bears against the flange 50 of the cone 51, slidingly fitted on the main portion of the shaft 40, or against a bearing in said flange. The ears 48 48 are pressed inward to clamp the screw 49 by means of the binder-bolt 52. The hub 53 of the rear wheel has an enlarged flange 54, from the central portion of which extends the sleeve 55, with which a gear 56 of any usual construction is secured, this gear engaging with the gear 39 of the drive-shaft 33. To the sleeve 55 is also secured the ball-bearing case 57, the balls in which bear on the cone 51, the ball-bearing 58 at the opposite end of the hub engaging the cone 41.

The adjustment of the rear wheel is effected by the bolt 46, and the adjustment of this wheel on its shaft 40 is accomplished by the bolt 49 to control the engagement of the gears 39 and 56.

Having thus described my invention, I claim as new and desire to secure by Letters Patent—

The combination with the yoke 28 having the collar, or hub, 29, and the screw-cone mounted in the collar, of the shaft 40 furnished with the clamping-frame 42 having the lateral ears 43, the pendent ears 48, and the member 45, the screw 44 working in the ears 43 to secure said frame to the cone, the bolt 46 working through a perforation in the member 45 and engaging with the yoke 28, the adjusting-screw 49 engaged between the ears 48, and the sliding cone 51 on the shaft 40 against which the screw 49 bears, as and for the purpose described.

CHARLES H. METZ.

Witnesses:
W. STANLEY CAMPBELL,
H. J. MILLER.